US 9,540,250 B2

(12) United States Patent
Schubert

(10) Patent No.: US 9,540,250 B2
(45) Date of Patent: Jan. 10, 2017

(54) COOLING TOWER WATER RECLAMATION SYSTEM AND METHOD

(71) Applicant: Combined Solar Technologies, Inc., Tracy, CA (US)

(72) Inventor: Frank Schubert, Tracy, CA (US)

(73) Assignee: Morningside Venture Investments Limited, Monaco (MC)

( * ) Notice: Subject to any disclaimer, the term of this patent is extended or adjusted under 35 U.S.C. 154(b) by 97 days.

(21) Appl. No.: 13/941,104

(22) Filed: Jul. 12, 2013

(65) Prior Publication Data

US 2014/0021030 A1 Jan. 23, 2014

Related U.S. Application Data

(60) Provisional application No. 61/672,519, filed on Jul. 17, 2012.

(51) Int. Cl.
*C02F 1/04* (2006.01)
*B01D 1/00* (2006.01)
(Continued)

(52) U.S. Cl.
CPC ............. *C02F 1/048* (2013.01); *B01D 1/0058* (2013.01); *B01D 1/10* (2013.01); *B01D 1/12* (2013.01);
(Continued)

(58) Field of Classification Search
CPC ............... C02F 1/02; C02F 1/04; C02F 1/048; C02F 2103/023; C02F 2201/00; B01D 1/0041; B01D 1/0052; B01D 1/04; B01D 1/06; B01D 1/28; B01D 3/00; B01D 3/02; B01D 3/04
(Continued)

(56) References Cited

U.S. PATENT DOCUMENTS

| 3,937,023 A | 2/1976 | Williamson |
| 3,987,784 A | 10/1976 | Godrick |

(Continued)

FOREIGN PATENT DOCUMENTS

| CN | 1830820 | 9/2006 |
| DE | 41 26 036 A1 | 2/1993 |

(Continued)

OTHER PUBLICATIONS

HEI, Basics of Closed Feedwater Heaters, Tech Sheet No. 127, Sep. 12, 2007.*

(Continued)

*Primary Examiner* — Prem C Singh
*Assistant Examiner* — Brandi M Doyle
(74) *Attorney, Agent, or Firm* — Foley & Lardner LLP

(57) ABSTRACT

A system for reclaiming contaminated water from a cooling tower in a power generation system includes a contaminant collection heat exchanger that receives a supply of extraction steam from the power generation system, and to receive and concentrate contaminants in the contaminated water by boiling the contaminated water and producing process steam using thermal energy from the extraction steam. A concentrate condensation device receives and further concentrates the contaminants collected in the contaminant collection heat exchanger. A process, heating, condensing and/or electrical generation subsystem receives the process steam from the contaminant collection heat exchanger.

17 Claims, 6 Drawing Sheets

(51) Int. Cl.
  *B01D 1/10* (2006.01)
  *B01D 1/12* (2006.01)
  *B01D 5/00* (2006.01)
  *C02F 1/16* (2006.01)

(52) U.S. Cl.
  CPC ........... *B01D 5/0015* (2013.01); *B01D 5/0057* (2013.01); *C02F 1/16* (2013.01); *Y02W 10/37* (2015.05)

(58) Field of Classification Search
  USPC ............. 202/152, 182, 185.1, 202, 235, 262
  See application file for complete search history.

(56) References Cited

U.S. PATENT DOCUMENTS

| | | | |
|---|---|---|---|
| 4,253,307 | A | 3/1981 | Smith |
| 4,321,151 | A | 3/1982 | McMullen |
| 4,512,851 | A | 4/1985 | Swearingen |
| 4,525,242 | A | 6/1985 | Iida |
| 5,156,706 | A * | 10/1992 | Sephton ............... 159/47.1 |
| 5,228,293 | A | 7/1993 | Vitale |
| 5,349,829 | A | 9/1994 | Tsimerman |
| 5,405,503 | A | 4/1995 | Simpson et al. |
| 5,484,524 | A | 1/1996 | MacLaren et al. |
| 5,661,017 | A | 8/1997 | Dunahay et al. |
| 5,724,828 | A * | 3/1998 | Korenic ............... 62/305 |
| 6,398,707 | B1 | 6/2002 | Wu et al. |
| 6,642,399 | B2 | 11/2003 | Boocock |
| 6,712,867 | B1 | 3/2004 | Boocock |
| 6,768,015 | B1 | 7/2004 | Luxem et al. |
| 6,822,105 | B1 | 11/2004 | Luxem et al. |
| 6,855,838 | B2 | 2/2005 | Haas et al. |
| 7,135,308 | B1 | 11/2006 | Bush et al. |
| 7,191,736 | B2 | 3/2007 | Goldman |
| 7,228,682 | B2 | 6/2007 | Kashler |
| 7,228,806 | B2 | 6/2007 | Dueck et al. |
| 7,340,899 | B1 | 3/2008 | Rubak et al. |
| 2002/0053196 | A1 | 5/2002 | Lerner et al. |
| 2005/0126170 | A1 | 6/2005 | Litwin |
| 2005/0198959 | A1 | 9/2005 | Schubert |
| 2005/0279095 | A1 | 12/2005 | Goldman |
| 2007/0017241 | A1 | 1/2007 | Hyland et al. |
| 2007/0119175 | A1 | 5/2007 | Ruggieri et al. |
| 2007/0125719 | A1 * | 6/2007 | Yarbrough et al. ........... 210/748 |
| 2011/0023485 | A1 * | 2/2011 | Schubert ................... 60/648 |

FOREIGN PATENT DOCUMENTS

| | | |
|---|---|---|
| DE | 195 02 953 A1 | 12/1995 |
| EP | 0 922 676 | 6/1999 |
| JP | 53-031575 | 3/1978 |
| JP | 09-103766 | 4/1997 |
| WO | WO 02/32534 A1 | 4/2002 |
| WO | WO 2006/036836 | 6/2006 |

OTHER PUBLICATIONS

El-Dessouky and Ettouney, Fundamentals of Salt Water Desalination, chapter 4 Multi-Effect Evaporation, 2002.*
International Search Report and Written Opinion for PCT/US2009/040516, mail date Oct. 15, 2009, 4 pages.
Kalogirou, Solar Thermal Collectors and Applications, Progress in Energy and Combustion Science, Elsevier Science Publishers, Amsterdam, NL, vol. 30, No. 3, Jan. 1, 2004, pp. 231-295.
Office Action for European Patent Application No. 09 733 547.5, mail date Aug. 28, 2012, 5 pages.
Rheinlander, J. et al., Electricity and potable water from a solar tower power plant, Renewable Energy, Pergamon Press, Oxford, GB, vol. 14, No. 1-4, May 8, 1998, pp. 23-28, XP004126814, ISSN: 0960-1481, DOI: 10.1016/S0960-1481 (98)00042-1.
Sheehan et al, A Look Back at the US Department of Energy's Aquatic Species Program—Biodiesel from Algae—Close Out Report, NREL/TP-580-24190, Jul. 1998, 328 pages.

* cited by examiner

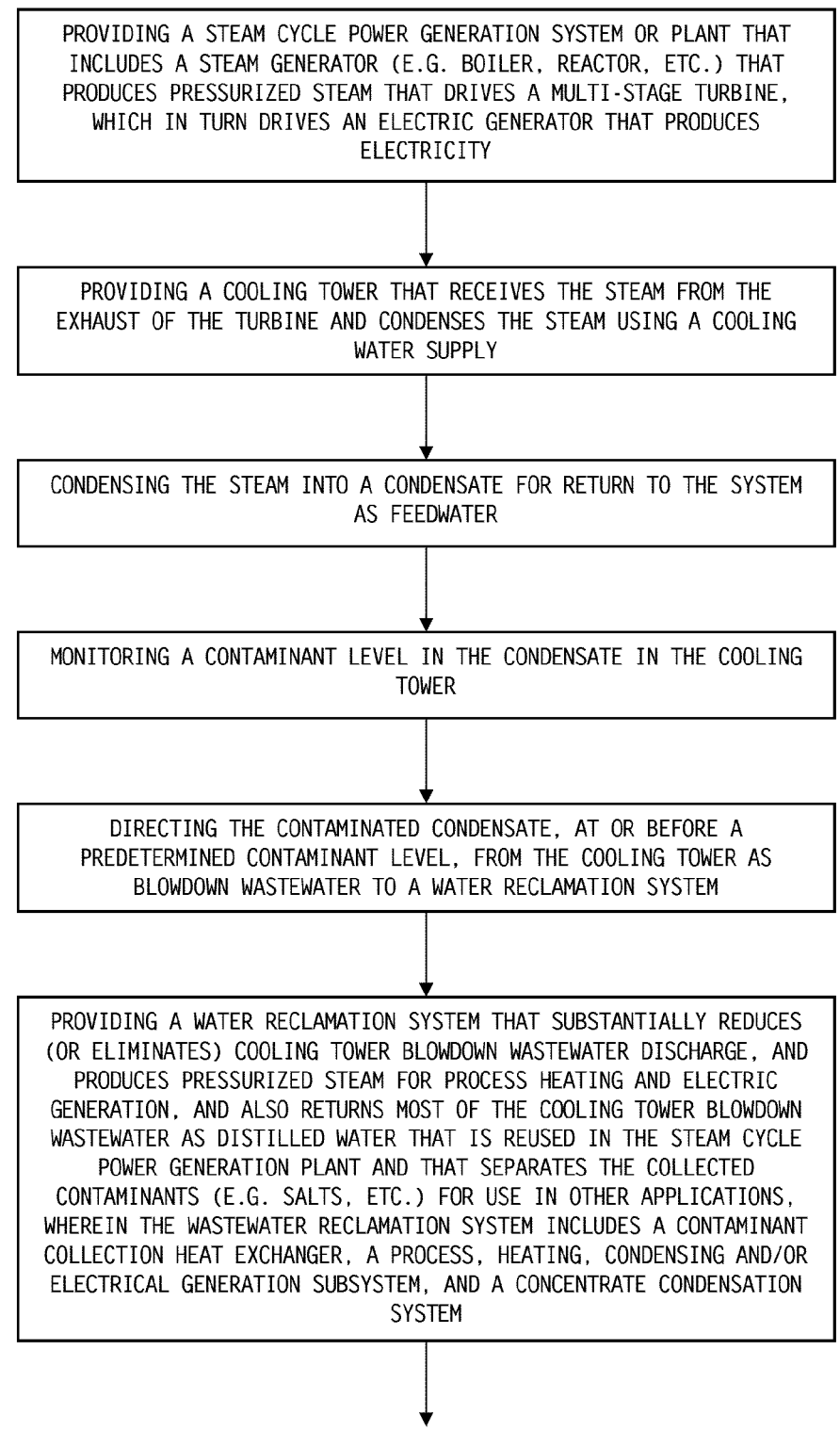

COOLING TOWER WATER RECLAMATION SYSTEM AND METHOD

CROSS-REFERENCE TO RELATED APPLICATION

This application claims the benefit of priority to U.S. Provisional Patent Application No. 61/672,519, which was filed on Jul. 17, 2012, the complete disclosure of which is incorporated by reference herein.

FIELD

The field of the disclosure relates generally to reclamation of water used in steam cycle power generation systems prior to returning the water to the environment. More specifically, the disclosure relates to a system and method of reclaiming contaminated water from cooling tower blowdown in wet-cooled steam cycle power generation systems. More particularly, the disclosure relates to a system and method of reclaiming contaminated water from cooling tower blowdown in a manner that returns a majority of the blowdown water for reuse in the steam cycle and that collects contaminants from the blowdown water in an evaporation process that provides thermal and/or electrical energy as a by-product.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Power generation systems and facilities that use steam as a working fluid (e.g. Rankine cycle systems, etc.) in which a source of thermal energy converts a feedwater to steam to drive a turbine and generator in simple or combined cycle operation are generally known. In such power generation systems, the steam exiting the turbine is typically condensed and then returned to the system as feedwater to complete the thermodynamic cycle. In some systems, a cooling tower, such as a wet cooling tower, is used to condense the steam for reuse in the power generation cycle. During the cooling and evaporation process, dissolved minerals tend to accumulate in the condensate within the cooling tower until the total dissolved solids (TDS) reaches an upper limit established for proper operation of the power generation system. In order to maintain TDS levels within acceptable limits, draw-off or blowdown of the condensate is frequently conducted and fresh make-up water must be added to the system to compensate for the removal of the water from blowdown. Typically, cooling tower blowdown in simple or combined cycle power generation plants amounts to one of the plant's largest sources of water discharge and the need for separate processing of the blowdown water to prevent environmental contamination.

Accordingly, it would be desirable to provide a system and method that can substantially reduce (or eliminate) cooling tower blowdown wastewater discharge. It would also be desirable to provide a system and method that produced pressurized steam for process heating or electric generation. It would also be desirable to provide a system and method that could process and return most of the cooling tower blowdown wastewater as distilled water that can be reused in the power generation plant and that can separate the collected contaminants (e.g. salts, etc.) for use in other applications.

SUMMARY

In an exemplary embodiment, a water reclamation system and method is provided for processing cooling tower blowdown wastewater in a power generation system/plant into distilled water for reuse in the plant, and to collect the wastewater contaminants in a form that is reusable in other applications, and that creates pressurized steam for use in heating or other process applications or for electricity generation as a by-product. According to the exemplary embodiment illustrated and described herein, the power generation plant with the water reclamation system and method integrated therein includes a steam generator (e.g. boiler, reactor, etc.) that produces pressurized steam for use in driving a multi-stage turbine, which in turn drives a generator that produces electricity. As the steam passes through the different stages of the turbine it loses pressure and energy. The water reclamation system extracts steam from the turbine at a pressure range between about 200 psig-500 psig for use as a source of thermal energy. The extracted steam flows though a contaminant collection heat exchanger where the steam gives up most of its heat and is condensed into distilled water, which is then returned to a cooling tower condensate line for reuse by the system. The balance (i.e. unextracted portion) of the steam passing though the turbine is then directed to the cooling tower where it is condensed and returned for reuse by the system via the cooling tower condensate line and to the boiler feedwater tank.

The cooling tower operates to condense the steam coming from the exhaust of the turbine using a cooling water supply derived from an outside source. The cooling tower condenses the steam into a condensate for return to the system as feedwater until the TDS or other contaminants reach a level where it can no longer be used in the power generation system. Concentrated cooling tower blowdown wastewater is then directed to the contaminant collection heat exchanger, where it is heated by the extracted steam and evaporated. The blowdown wastewater contaminants are collected within the contaminant collection heat exchanger and the evaporated blowdown wastewater is discharged as process steam that is directed to a process (e.g. heating, electric generation, cooling, etc.) where it subsequently condenses into distilled water that is returned to the power generation system via the cooling tower condensate line. The contaminant collection heat exchanger collects and concentrates the contaminants from the blowdown wastewater into a contaminant concentrate that is directed via a concentrate blowdown line to a concentrate condensation system (e.g. Ecopod, etc.). The concentrate condensation system further evaporates and concentrates the contaminant concentrate blowdown, with the evaporate being condensed and returned to the system via the condensate line, and the solids from the concentrate are dewatered and removed from the concentrate condensation system via a salt removal line.

BRIEF DESCRIPTION OF THE DRAWINGS

Exemplary embodiments of the disclosure will hereafter be described with reference to the accompanying drawings, wherein like numerals denote like elements.

DETAILED DESCRIPTION

Figure 1A:
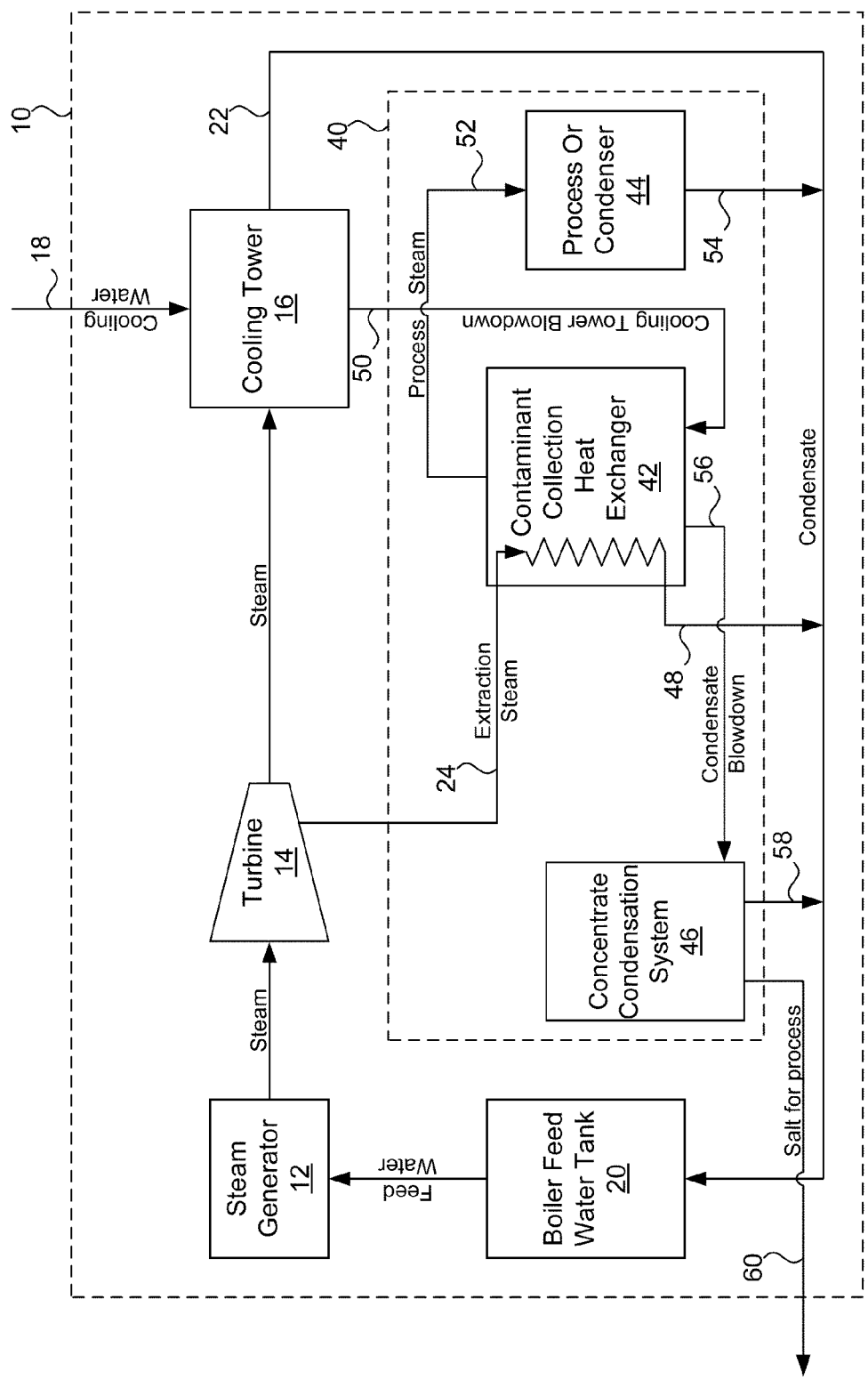
FIG. 1A depicts a schematic diagram of a water reclamation system for use with a steam cycle power generation system, according to an exemplary embodiment.

With reference to FIG. 1A, a water reclamation system and method is shown according to an exemplary embodiment for processing cooling tower blowdown wastewater from a power generation system/plant into distilled water for reuse in the plant, and to collect the wastewater contaminants (e.g. salts, etc.) in a form that is salvageable for, or reusable in, other applications, and that creates pressurized steam for use in heating and/or other process applications and/or for electricity generation as a by-product.

According to the exemplary embodiment illustrated and described herein, the steam cycle power generation system or plant 10 includes a steam generator 12 (e.g. boiler, reactor, etc.) that produces pressurized steam that drives a multi-stage turbine 14, which in turn drives an electric generator (not shown) that produces electricity. A cooling tower 16 receives the steam from the exhaust of the turbine 14 and condenses the steam using a cooling water supply 18. The cooling tower 16 uses the cooling water supply 18 to condense the steam into a condensate for return to the system 10 as feedwater where it is received in feedwater tank 20 and directed back to the steam generator 12 to continue the cycle. The condensate in the cooling tower 16 is collected and returned back to the system 10 until the TDS or other contaminants reach a predetermined level such that the condensate can no longer be used as feedwater in the power generation system 10, at which point it is removed as cooling tower blowdown wastewater.

The water reclamation system and method of the present disclosure provides a system and method that substantially reduces (or eliminates) cooling tower blowdown wastewater discharge, and produces pressurized steam for process heating and electric generation, and also returns most of the cooling tower blowdown wastewater as distilled water that is reused in the steam cycle power generation plant 10 and that separates the collected contaminants (e.g. salts, etc.) for use in other applications. The cooling tower blowdown wastewater reclamation system 40 is shown by way of example in FIG. 1A to include a contaminant collection heat exchanger 42, a process, heating, condensing and/or electrical generation subsystem 44, and a concentrate condensation system 46.

According to the exemplary embodiment illustrated in FIG. 1A, the steam cycle power generation plant 10 with cooling tower blowdown wastewater reclamation system and method 40 integrated therein includes the steam generator 12 (e.g. boiler, reactor, etc.) that produces pressurized steam for use in driving the multi-stage turbine 14, which in turn drives the generator (not shown) that produces electricity. As the steam passes through the different stages of the turbine 14, the steam loses pressure and energy. The wastewater reclamation system 40 extracts steam from the turbine 14 at a pressure within a range between about 200 psig-500 psig for use as a source of thermal energy in the contaminant collection heat exchanger 42 (which may be a shell and tube heat exchanger, etc.). However, other pressure ranges may be used as appropriate for other embodiments. The extracted steam flows though the contaminant collection heat exchanger 42 where the extracted steam gives up most of its heat and is condensed into distilled water, which is then returned via line 48 to a cooling tower condensate line 22 for reuse by the system 10. The balance (i.e. unextracted portion) of the steam passing though and exhausted by the turbine 14 is directed to the cooling tower 16 where it is condensed and returned for reuse by the system 10 via the cooling tower condensate line 22 and to the steam generator feedwater tank 20.

The cooling tower 16 operates to condense the steam received from the exhaust of the turbine 14 using the cooling water supply 18 (e.g. derived from an outside source, etc.). The cooling tower 16 condenses the steam into a condensate for return to the system 10 as feedwater until the TDS or other contaminants (e.g. as may be carried within the condensed steam or within the outside cooling water supply that is mixed therewith) reach a predetermined level that can no longer be used as feedwater in the steam cycle power generation system 10. Cooling tower blowdown wastewater (i.e. having the contaminants contained therein) is then directed to the contaminant collection heat exchanger 42 (e.g. in a "batch" like manner or the like) via line 50, where the blowdown wastewater is heated and evaporated by the extracted steam. The contaminants carried by the blowdown wastewater are collected within the contaminant collection heat exchanger 42 as the evaporated blowdown wastewater is discharged from the heat exchanger 42 as process steam via line 52 that is directed to the process, heating, condensing and/or electrical generation subsystem 44 where it subsequently condenses into distilled water that is returned to the power generation system 10 via line 54 and the cooling tower condensate line 22. The contaminant collection heat exchanger 42 advantageously collects and concentrates the contaminants from the blowdown wastewater into a contaminant concentrate that is directed from the contaminant collection heat exchanger 42 via a concentrate blowdown line 56 to a concentrate condensation system 46. The concentrate condensation system 46 further evaporates and concentrates the contaminant concentrate blowdown, with the evaporate being subsequently condensed and returned to the system 10 via line 58 and the condensate line 22, and the solids that are salvaged from the concentrate are dewatered and removed from the concentrate condensation system 46 via a salt removal line 60 to be advantageously reused or recycled in other applications. Although processing and reclamation of the cooling tower blowdown wastewater has been described for operation in a batch-like manner, the blowdown wastewater may also be processed in an a substantially continuous (e.g. "online" etc.) manner using the system in order to maintain a contaminant level within the condensate a relatively stable and acceptable level. All such variations are intended to be within the scope of this disclosure.

Figure 3:
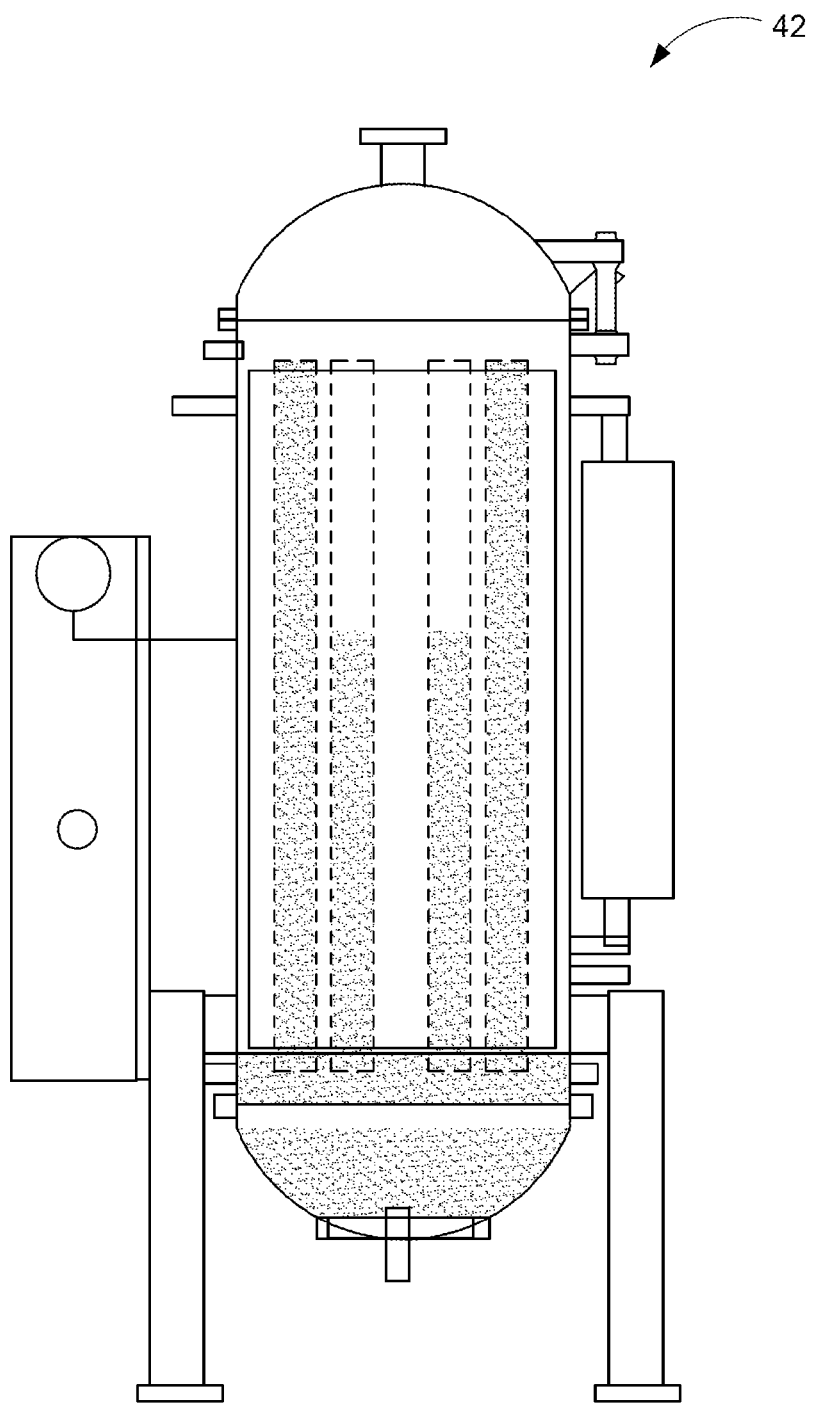
FIG. 3 depicts a schematic image of a contaminant collection device in the form of a vertical tube and shell heat exchanger, according to an exemplary embodiment.

According to one embodiment, the contaminant collection heat exchanger 42 comprises a vertical shell-and-tube heat exchanger (e.g., boiler, steam generator, etc.—as shown more particularly in FIG. 3, and as described more thoroughly in U.S. Patent Application Publication No. 2011-0265474 titled "Water Reclamation System and Method"

filed on Jul. 13, 2011, the complete disclosure of which is incorporated by reference herein for all purposes). According to one embodiment, the contaminated water is directed in through the bottom of the tube-side of the heat exchanger 42 where it is heated and converted (e.g., boiled, evaporated, etc.) to steam and discharged from the tube side at the top of the heat exchanger 42. The heat for converting the contaminated water to steam is provided by the extracted steam drawn from one or more stage of the turbine 14 via line 24 and directed through the shell side of the heat exchanger 42. The conversion of the contaminated blowdown wastewater to steam results in the concentration or distillation of the contaminants (e.g., TDS, etc.) from the contaminated water so that the contaminants are collected within the heat exchanger 42 (e.g., within the bottom and/or top end bells and along the surfaces of the tubes of the heat exchanger).

According to the illustrated embodiment, the heat exchanger 42 may be provided with the following specific features by way of example, however variations in sizes, quantities and capacities to accommodate other applications are intended to be within the scope of the invention: the components are formed from steel, such as 304 stainless steel, or carbon steel; shell side design pressure is approximately 100 psig and design temperature is approximately 560° F.; the number of tubes is approximately 97 tubes each having an outside diameter of approximately 3.5 inches; the energy rating of the heat exchanger is approximately 150 hp, but may be scaled up to approximately 500 hp.

According to the illustrated embodiment, the heat exchanger 42 is intended to operate in a manner that actively promotes "fouling" of the heat exchanger surfaces (unlike most conventional heat exchangers that are operated in a manner intended to avoid fouling), as a method for separating the contaminants from the contaminated blowdown wastewater to form the contaminate concentrate. The contaminate concentrate may be removed from the heat exchanger 42 in a generally non-invasive manner by periodically discharging the contaminate concentrate from a bottom drain of the heat exchanger (e.g., blow-down, blow-by, etc.) and directing the contaminate concentrate via concentrate blowdown line 56 to the contaminant concentration system 46.

Although only one heat exchanger 42 is shown in FIG. 1A for clarity, two or more heat exchangers may be provided (e.g., arranged and connected in parallel) to obtain a desired capacity for reclaiming the contaminated water from the steam cycle power generation system. According to such an embodiment, one or more "extra" heat exchangers may be provided in order to accommodate maintenance and removal of collected contaminants, so that a desired number of heat exchangers remain in operation while others are cleaned and/or maintained. According to alternative embodiments, the contaminant collection heat exchanger 42 may be a horizontal shell and tube heat exchanger, tank, still, or any other type of apparatus for converting contaminated water to steam and collecting the contaminants within the apparatus and discharging the steam for use in other applications.

According to an alternative embodiment, the contaminant collection heat exchanger 42 may be provided in multiple stages (e.g., in a cascade arrangement, etc.). Such a multi-stage contaminant collection device may be suited to applications having particularly high levels of contaminants, or for applications where zero liquid discharge is desired. For example, according to the illustrated embodiment, a first contaminant collection heat exchanger or boiler operates at relatively high pressure as a contaminant collection device in a manner as previously described. Highly contaminated liquid water having a concentrated collection of contaminants (e.g., "concentrate") is directed (e.g. by blowdown, etc.) from the first boiler to a secondary (e.g., supplemental, cascade, etc.) boiler operating at a reduced pressure. The secondary boiler re-processes (e.g., boils, evaporates, etc.) the concentrate and discharges a further concentrated collection of contaminants to a third boiler for continued processing, or to an evaporator such as a plate (e.g. which may receive steam as a heat source from the steam generator, the contaminant collection heat exchanger, or other steam source, or may receive thermal transfer fluid from an intermediate heat exchanger as described with reference to FIG. 1B) or a pan evaporator or the like, or to an evaporation pond to further collect and separate the contaminants or salvaged minerals from the water. Accordingly, all such variations of the contaminant collection heat exchanger are included within this disclosure.

Referring further to FIG. 1A, certain chemical compounds may be separated from highly concentrated contaminated water discharged from contaminate concentration device 46 via line 60, according to an exemplary embodiment. According to the illustrated embodiment, the concentrate may be used to separate (e.g., by precipitation, crystallization, etc.) certain other commercially desirable chemical compounds from the cooling tower wastewater, such as calcium sulfate, sodium sulfate, etc. For example, the separation of sodium sulfate may be conducted using any suitable procedure, such as concentration and temperature reduction.

According to other embodiments, other heat sources may be used in the contaminant collection heat exchanger 42 to heat the cooling tower blowdown wastewater. For example, exhaust or waste heat associated with converting the feedwater to steam in the steam generator 12 may be used. By further way of example, the contaminant collection heat exchanger 42 may be operably associated with a combustion device, such as a solar-thermal concentrator, a biomass combustion device, or a natural gas heat generator, as described in more detail in U.S. Patent Application Publication No. 2011-0265474 titled "Water Reclamation System and Method" filed on Jul. 13, 2011, the complete disclosure of which is incorporated by reference herein for all purposes.

Referring further to FIG. 1A, the steam exits the contaminant collection heat exchanger 42 and is directed to the process, heating, condensing and/or electrical generation subsystem 44. The process, heating, condensing and/or electrical generation subsystem 44 may include any of a wide variety of devices or equipment intended to advantageously use the steam and heat energy discharged as a byproduct from the contaminant collection heat exchanger 42. For example, a steam energy conversion device (e.g. turbine, etc.) may convert the steam energy to a mechanical output and an electric power generator can use the mechanical output to generate electricity. Preferably, the amount of electricity generated is sufficient to power all electrically-operated equipment in the system (e.g., valves, motors, actuators, control devices, etc.) so that the system is electrically self-sustaining. The steam that is exhausted from the process turbine (or directly from the heat exchanger 42) may be directed to other heating or process loads.

For example, the heat loads may be arranged in a parallel configuration and include such loads as: heating a potable or domestic water supply; and heating for a laundry operation; and heating for food processing operations, and heating for an ethanol distillation device; and heating for dairy processing equipment; and enhanced evaporation of the contaminant concentrate or a compost material. Accordingly, all such heat loads that can advantageously be supplied with 'free heat' from the water reclamation process are intended to be within the scope of this disclosure.

After providing 'free heat' for the heat loads and/or for generating electricity that may be used to power the system 40 in a relatively self-sustaining manner, the steam is typically a mixture of low quality liquid and vapor and is exhausted to a condenser or other device to condense any remaining vapor to return the steam to a liquid state in distilled form before being returned to system 10 via line 54 and the condensate line 22.

Figure 1B:
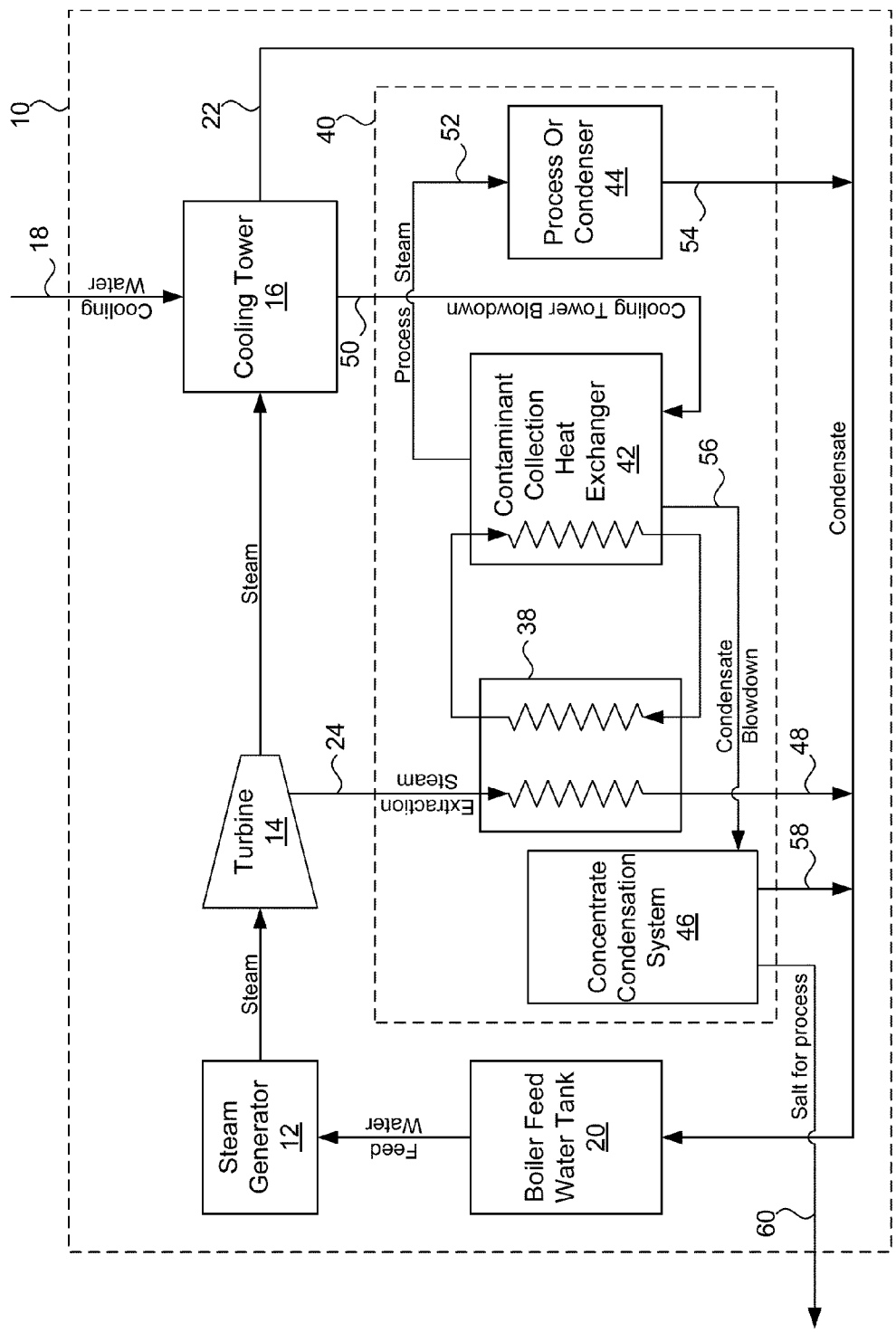
FIG. 1B depicts a schematic diagram of a water reclamation system for use with a steam cycle power generation system, according to another exemplary embodiment.

Referring to FIG. 1B, a water reclamation system and method is shown according to another exemplary embodiment for processing cooling tower blowdown wastewater from a power generation system/plant into distilled water for reuse in the plant, and to collect the wastewater contaminants (e.g. salts, etc.) in a form that is salvageable for, or reusable in, other applications, and that creates pressurized steam for use in heating and/or other process applications and/or for electricity generation as a by-product. The embodiment of FIG. 1B is substantially similar to the embodiment of FIG. 1A as previously described, but also includes an intermediate heat exchanger 38 configured to receive the supply of extraction steam from turbine 14 and to heat a thermal transfer fluid that circulates in a closed-loop flowpath through the contaminant collection heat exchanger to provide a source of heat for boiling the cooling tower blowdown wastewater. According to one embodiment, the thermal transfer fluid is known as XCELTHERM® 600 commercially available from Radco Industries of LaFox, Ill. According to one embodiment, the control system regulates the flow of extraction steam to heat exchanger 38 and the flow of the thermal transfer fluid as necessary to maintain a relatively constant temperature and flow of the heat transfer fluid to the contaminant collection heat exchanger.

According to one embodiment, a reservoir (not shown) may be provided for storing the thermal transfer fluid. Such a reservoir may be insulated, or otherwise provided as an energy storage device for storing the thermal energy of the heated thermal transfer fluid. For example, the reservoir may be provided as a thermal energy storage system. One type of thermal energy storage system may be provided as a buffer storage, for example to be accessed during transitory time periods (of e.g., about 30 minutes to about 3 hours) during system operating conditions where drawing extraction steam from the turbine may be undesirable. In contrast, the thermal energy storage system may be provided for longer-time storage, for example 3 hours to 24 hours, etc.

The thermal energy storage system may include a thermal energy storage medium and a plurality of conduits buried within the storage medium in a heat exchange relationship with the storage medium to form a composite structure, and the composite structure is surrounded by a layer of an insulating material. Each conduit is arranged to carry the thermal transfer fluid through the thermal energy storage medium and may also have thermally conductive heat transfer elements (e.g., fins, plates, disks, sheets, etc,) to enhance heat transfer between the storage medium and the conduits. Each of the heat transfer elements functions alternatingly as a heat distributor and retriever and it extends into the energy storage medium for the purpose of transferring thermal energy reversibly between the thermal transfer fluid in the associated conduit and the discrete (thermally conductive) components of the medium. The thermal energy storage system may be located at least in part above the local ground level, or located below ground level and integrated in the localized ground so that the ground itself forms an extension of the thermal energy storage system (e.g., located beneath or around the cooling tower or other suitable location). All such embodiments are intended to be within the scope of this disclosure.

Figure 4:
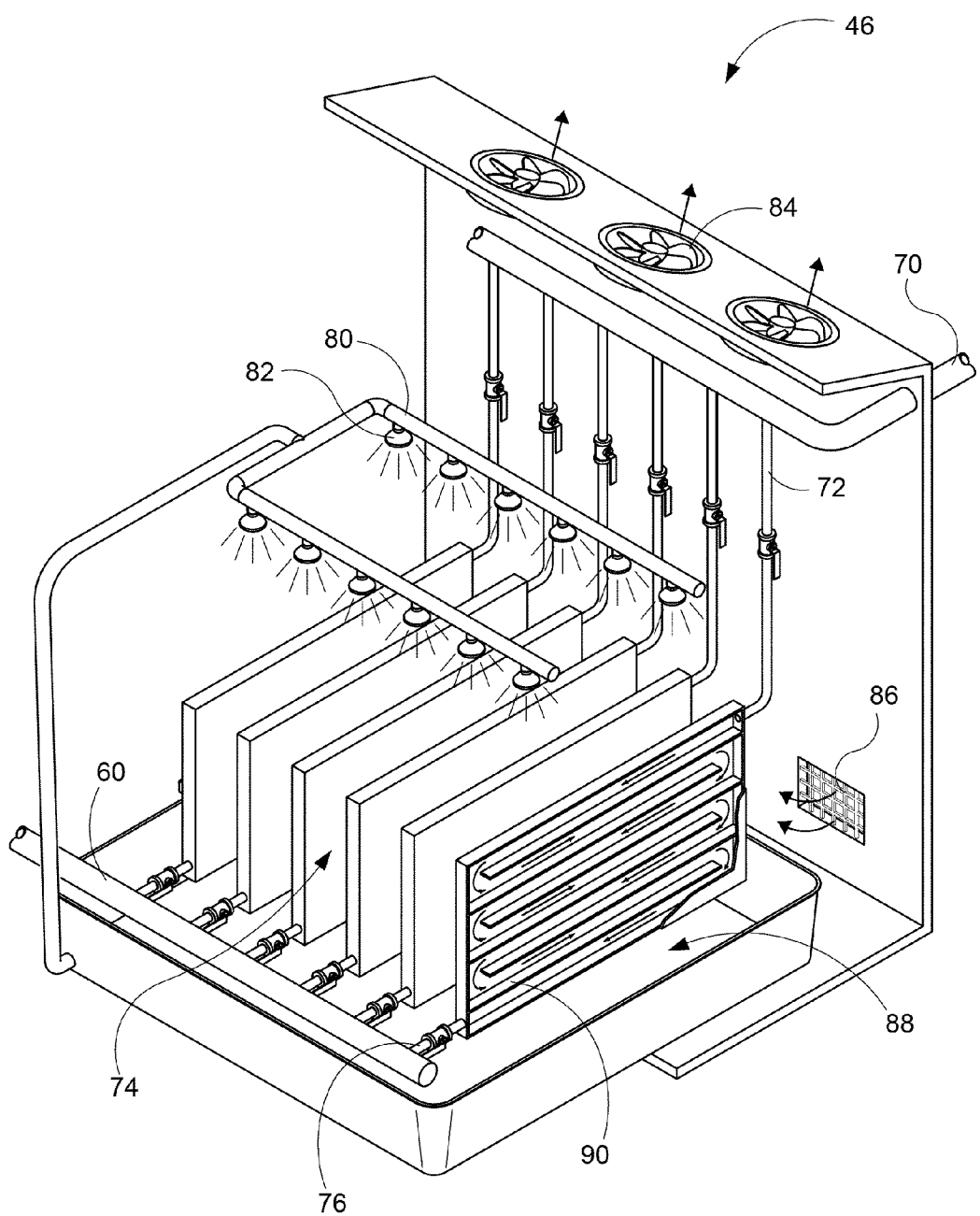
FIG. 4 depicts a schematic diagram of a concentrate condensing system for a water reclamation system, according to an exemplary embodiment.

Referring to FIG. 4, the concentrate condensing system is further shown according to one exemplary embodiment for use in the water reclamation system and method described herein. Steam condensing system 46 can be arranged within an enclosure (e.g. building, etc.) and is shown by way of example to include a concentrate supply header 70, concentrate supply branch lines 72, planar heat exchangers 74, condensate branch lines 76, condensate header 60, water spray lines 80 having spray nozzles 82, air exhaust fans 84 disposed at an upper location on the enclosure, and air inlet dampers 86 disposed at a lower location on the enclosure. Concentrate condensing system 46 is intended to provide a modular and scalable condensing system whose condensing capacity may be expanded or contracted to suit the needs of a particular application by increasing or decreasing the number of heat exchangers. The enclosure (not shown for clarity) includes a floor area having a trough 88, wall areas having the air inlet dampers 86, and a ceiling area having the air exhaust fans 84.

Referring further to FIG. 4, the contaminate concentrate discharged from the contaminate collection heat exchanger 42 can be routed to the supply header 70, and then through individual branch lines 72 to each of the heat exchangers 74 at a relatively low pressure (e.g. within a range of approximately 1-7 psig, and more particularly within a range of approximately 3-5 psig). The water spray lines 80 and nozzles 82 operate to spray water onto the external surfaces of the planar heat exchangers 74 to provide a source of cooling to further condense the concentrated contaminants. The spray of cooling water can be collected in the trough 88 for recirculation to the spray lines 80 and nozzles 82, or for other suitable disposal. The air exhaust fans 84 draw outside ambient air through the air inlet vents 86 and direct an airflow over/around/along the external surfaces of the planar heat exchanger 74 as another source of cooling to condense the contaminate concentrate. The combined use of a water spray and air flow provides both conduction and convection cooling to the planar heat exchangers 74, and can also provide cooling through the latent heat of vaporization of the water spray on the outside surface of the heat exchanger 74.

Referring further to FIG. 4, the concentrated contaminants are then discharged via line 60 for salvage, reuse and/or recycling as previously described herein. The planar heat exchanger 74 has an interior which may include a suitable pattern of baffles 90 (shown by way of example as a horizontal pattern of baffles, but the baffles may have any suitable pattern and orientation) for directing the contaminant concentrate in a desired flow path through the interior of the planar heat exchanger 74, and the flow rate of the contaminant concentrate through the flow path can be adjusted (e.g. balanced, etc.—such as by valves on the branch lines) to obtain a desired condensation of the contaminant concentrate within the planar heat exchangers 74.

As described more thoroughly in U.S. Patent Application Publication No. 2011-0265474 titled "Water Reclamation System and Method" filed on Jul. 13, 2011, the complete disclosure of which is incorporated by reference herein for all purposes, the planar heat exchanger 74 may also include other features, such as fins (not shown), on the inside and/or outside surface to enhance heat transfer.

The system also includes a control system, including a control device such as a microprocessor or programmable logic controller or the like configured to receive, from appropriate instrumentation, signals that are representative of the various parameters associated with operation of the system. The instrumentation includes temperature sensing devices (e.g., thermocouples, RTDs, thermistors and the like), pressure sensing devices (e.g., gages, transducers, etc.), flow sensing devices (e.g., differential pressure flow transducers, etc.), rotational speed sensing devices (e.g., tachometer, etc.), electric power meters (e.g., volt meters, watt meters, amp meters, etc.), and level sensors (e.g., site-glasses, differential pressure type level transducers, etc.). The parameters associated with operation of the system that are monitored by the instrumentation and controlled by the control device include:

(a) water level and contaminant level in the cooling tower,
(b) blowdown wastewater flow rate to the contaminant collection heat exchanger,
(c) pressure and temperature of the contaminated water/steam in the contaminant collection heat exchanger 42,
(d) level of the contaminated water in the contaminant collection heat exchanger 42,
(e) temperature, pressure and flow rate of the extracted steam to the contaminant collection heat exchanger 42,
(f) position of the valves of the system (i.e. open, closed, throttled, etc.),
(g) temperature and pressure of the steam exiting the contaminant collection heat exchanger 42, and
(h) temperature and pressure of the steam exiting the heat loads.

According to any exemplary embodiment, the control system or device contemplates methods, systems and program products on any machine-readable media for accomplishing various operations including those described herein. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Figure 2:
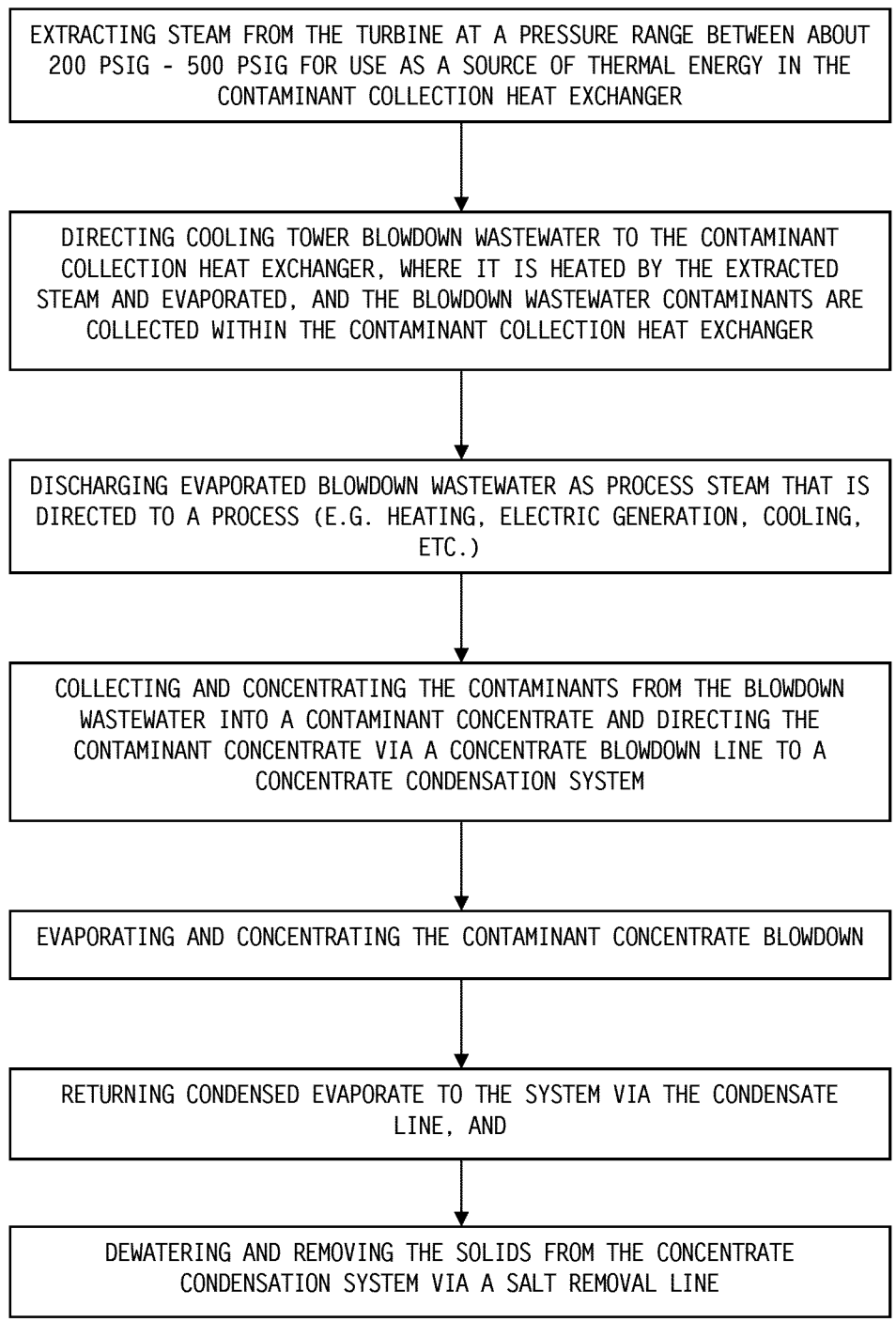
FIG. 2 depicts a block diagram of a method for a water reclamation system for use with a steam cycle power generation system, according to an exemplary embodiment.

Referring to FIG. 2, a method for processing cooling tower blowdown wastewater from a power generation system/plant into distilled water for reuse in the plant, and to collect the wastewater contaminants (e.g. salts, etc.) in a form that is salvageable for, or reusable in, other applications, and that creates pressurized steam for use in heating and/or other process applications and/or for electricity generation as a by-product is shown according to one embodiment to include the following steps (among other possible steps):

(a) providing a steam cycle power generation system or plant that includes a steam generator (e.g. boiler, reactor, etc.) that produces pressurized steam that drives a multi-stage turbine, which in turn drives an electric generator that produces electricity,
(b) providing a cooling tower that receives the steam from the exhaust of the turbine and condenses the steam using a cooling water supply,
(c) condensing the steam into a condensate for return to the system as feedwater,
(d) monitoring a contaminant level in the condensate in the cooling tower,
(e) directing the contaminated condensate, at or before a predetermined contaminant level, from the cooling tower as blowdown wastewater to a water reclamation system,
(f) providing a water reclamation system that substantially reduces (or eliminates) cooling tower blowdown wastewater discharge, and produces pressurized steam for process heating and electric generation, and also returns most of the cooling tower blowdown wastewater as distilled water that is reused in the steam cycle power generation plant and that separates the collected contaminants (e.g. salts, etc.) for use in other applications, wherein the wastewater reclamation system includes a contaminant collection heat exchanger, a process, heating, condensing and/or electrical generation subsystem, and a concentrate condensation system,
(g) extracting steam from the turbine at a pressure range between about 200 psig-500 psig for use as a source of thermal energy in the contaminant collection heat exchanger,
(h) directing cooling tower blowdown wastewater to the contaminant collection heat exchanger, where it is heated by the extracted steam and evaporated, and the blowdown wastewater contaminants are collected within the contaminant collection heat exchanger,
(i) discharging evaporated blowdown wastewater as process steam that is directed to a process (e.g. heating, electric generation, cooling, etc.),
(j) collecting and concentrating the contaminants from the blowdown wastewater into a contaminant concentrate and directing the contaminant concentrate via a concentrate blowdown line to a concentrate condensation system,
(k) evaporating and concentrating the contaminant concentrate blowdown,
(l) returning condensed evaporate to the system via the condensate line, and
(m) dewatering and removing the solids from the concentrate condensation system via a salt removal line.

However, any one or more (or any combination) of a variety of these or other steps may be included, in any particular order to accomplish the method of reclaiming cooling water blowdown wastewater from a steam cycle power generation system.

According to any exemplary embodiment, certain portions of the system for any desirable facility may be "packaged" in a transportable manner for use in any of a wide variety of locations or facility or operation sites (or the like) where cooling tower blowdown wastewater reclamation is desirable or mandatory. Such a package may include the components mounted on a skid, or within a trailer that is readily transportable for rapid deployment to any of a wide variety of sites. The trailer would include all necessary interfaces and connections, such as a natural gas connection, electric service connection(s) for electric power generated, and connections to receive the extracted steam and the contaminated water and to discharge exhaust steam to suitable process and/or condensing equipment. Accordingly, all such variations are intended to be within the scope of the disclosure.

The foregoing description of exemplary embodiments of the disclosure have been presented for purposes of illustration and of description. It is not intended to be exhaustive or to limit the invention to the precise form disclosed, and modifications and variations are possible in light of the above teachings or may be acquired from practice of the invention. The functionality described may be distributed among modules that differ in number and distribution of functionality from those described herein. Additionally, the order of execution of the functions may be changed depending on the embodiment. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It should be noted that the orientation of various elements may differ according to other exemplary embodiments, and that such variations are intended to be encompassed by the present disclosure.

It is also important to note that the construction and arrangement of the systems and methods for the water reclamation system as shown in the various exemplary embodiments is illustrative only. Although only a few embodiments of the present inventions have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the present disclosure.

What is claimed is:

1. A system for reclaiming contaminated water from a cooling tower in a power generation system, comprising:
    a contaminant collection heat exchanger configured to receive a supply of extraction steam from the power generation system, and to receive and concentrate contaminants in the contaminated water by boiling the contaminated water and producing process steam using thermal energy from the extraction steam, wherein the contaminant collection heat exchanger condenses the extraction steam into first distilled water and discharges the first distilled water into a shared condensate line;
    a concentrate condensation device configured to receive and further concentrate the contaminants collected in the contaminant collection heat exchanger, wherein the concentrate condensation device evaporates second distilled water from the contaminants and discharges the second distilled water into the shared condensate line;
    a condensate blowdown line configured to receive the contaminants from the contaminant collection heat exchanger and to provide the contaminants to the concentrate condensation device;
    a process, heating, condensing and/or electrical generation subsystem, separate from the concentrate condensation device and the contaminant collection heat exchanger, and configured to receive a first portion of the process steam produced by the contaminant collection heat exchanger, condense the process steam into third distilled water, and discharge the third distilled water into the shared condensate line; and
    a process steam line configured to receive the process steam from the contaminant collection heat exchanger and to provide the process steam to the process, heating, condensing and/or electrical generation subsystem and to the concentrate condensation device;
    wherein the concentrate condensation device receives a second portion of the process steam from the contaminant collection heat exchanger and uses thermal energy from the process steam to enhance evaporation of the second distilled water from the contaminants;
    wherein the shared condensate line combines the first distilled water, the second distilled water, and the third distilled water and delivers the combined distilled water to the power generation system;

wherein the power generation system boils the combined distilled water to generate the supply of extraction steam.

2. The system of claim 1, wherein the contaminant collection heat exchanger comprises a shell and tube heat exchanger configured to collect contaminants within the heat exchanger.

3. The system of claim 2, wherein the contaminants are collected at least partially within the tubes of the contaminant collection heat exchanger.

4. The system of claim 3, further comprising at least one second heat exchanger configured to receive the contaminants and contaminated water from the contaminant collection heat exchanger for concentrating the contaminants.

5. The system of claim 1, wherein the concentrate condensation device comprises at least one evaporation device configured to receive the contaminants and contaminated water from the contaminant collection heat exchanger to concentrate the contaminants.

6. The system of claim 5, wherein the evaporation device comprises an evaporation pan that is operable to remove substantially all liquid from the contaminants.

7. The system of claim 6, wherein the evaporation pan is configured to separate one or more minerals from the contaminated water.

8. The system of claim 5, wherein the evaporation device comprises a plate evaporator configured to receive steam as a heat source to evaporate the contaminated water from the contaminant collection heat exchanger.

9. A system for reclaiming contaminated water from a cooling tower in a power generation system, comprising:
- an intermediate heat exchanger configured to receive a supply of extraction steam from the power generation system and to heat a thermal transfer fluid, wherein the intermediate heat exchanger condenses the extraction steam into first distilled water and discharges the first distilled water into a shared condensate line;
- a contaminant collection heat exchanger configured to receive the thermal transfer fluid heated by the intermediate heat exchanger, and to receive and concentrate contaminants in the contaminated water by boiling the contaminated water and producing process steam using thermal energy from the heated thermal transfer fluid;
- a concentrate condensation device configured to receive and further concentrate the contaminants collected in the contaminant collection heat exchanger, wherein the concentrate condensation device evaporates second distilled water from the contaminants and discharges the second distilled water into the shared condensate line;
- a condensate blowdown line configured to receive the contaminants from the contaminant collection heat exchanger and to provide the contaminants to the concentrate condensation device;
- a process, heating, condensing and/or electrical generation subsystem, separate from the concentrate condensation device, the intermediate heat exchanger, and the contaminant collection heat exchanger, and configured to receive a first portion of the process steam produced by the contaminant collection heat exchanger, condense the process steam into third distilled water, and discharge the third distilled water into the shared condensate line; and
- a process steam line configured to receive the process steam from the contaminant collection heat exchanger and to provide the process steam to the process, heating, condensing and/or electrical generation subsystem and to the concentrate condensation device;
- wherein the concentrate condensation device receives a second portion of the process steam from the contaminant collection heat exchanger and uses thermal energy from the process steam to enhance evaporation of the second distilled water from the contaminants;
- wherein the shared condensate line combines the first distilled water, the second distilled water, and the third distilled water and delivers the combined distilled water to the power generation system;
- wherein the power generation system boils the combined distilled water to generate the supply of extraction steam.

10. The system of claim 9, further comprising a thermal energy storage system configured to receive heat from the thermal transfer fluid in a first mode and to transfer heat to the thermal transfer fluid in a second mode.

11. The system of claim 9, wherein the concentrate condensation device comprises: (i) a plurality of vertically oriented planar heat exchangers having an interior with a pattern of baffles for directing the concentrated contaminants through a flow path, and an exterior, (ii) a water supply and nozzles configured to direct cooling water onto the exterior of the planar heat exchangers, and (iii) at least one fan configured to create an airflow over the exterior of the planar heat exchangers.

12. The system of claim 11 further comprising a trough disposed at least partially beneath the planar heat exchangers and configured to collect the cooling water.

13. A method for reclaiming contaminated water from a cooling tower in a power generation system, comprising:
- providing a contaminant collection heat exchanger having a first side configured to receive a supply of extraction steam from the power generation system and second side configured to receive contaminants in the contaminated water from the cooling tower, and configured to use thermal energy from the extraction steam to boil the contaminated water to produce process steam and to concentrate the contaminants in the heat exchanger, wherein the contaminant collection heat exchanger condenses the extraction steam into first distilled water and discharges the first distilled water into a shared condensate line;
- providing a concentrate condensation device configured to receive and further concentrate contaminants collected in the heat exchanger, wherein the concentrate condensation device evaporates second distilled water from the contaminants and discharges the second distilled water into the shared condensate line, and wherein the concentrate condensation device receives the contaminants via a condensate blowdown line;
- providing a process, heating, condensing and/or electrical generation subsystem, separate from the concentrate condensation device and the contaminant collection heat exchanger, the process, heating, condensing and/or electrical generation subsystem configured to receive a first portion of the process steam from the heat exchanger via a process steam line, condense the process steam into third distilled water, and discharge the third distilled water into the shared condensate line;
- receiving a second portion of the process steam in the concentrate condensation device; and
- extracting thermal energy from the process steam and providing the extracted thermal energy to the concentrate condensation device;

using the extracted thermal energy from the process steam to enhance evaporation of the second distilled water from the contaminants;

combining the first distilled water, the second distilled water, and the third distilled water within the shared condensate line and delivering the combined distilled water to the power generation system via the shared condensate line; and boiling the combined distilled water at the power generation system to generate the extraction steam.

14. The method of claim 13, wherein the step of providing a concentrate condensation device further comprises providing (i) a plurality of vertically oriented planar heat exchangers having an interior with a pattern of baffles for directing the concentrated contaminants through a flow path, and an exterior, (ii) a water supply and nozzles configured to direct cooling water onto the exterior of the planar heat exchangers, and (iii) at least one fan configured to create an airflow over the exterior of the planar heat exchangers.

15. The method of claim 13, further comprising separating contaminants from the contaminated water by directing the contaminated water to an evaporation device.

16. The method of claim 15, wherein the evaporation device comprises an evaporation pan.

17. The method of claim 15, wherein the evaporation device comprises a plate evaporator configured to receive steam as a heat source to evaporate the contaminated water from the contaminant collection heat exchanger.

\* \* \* \* \*